United States Patent [19]

Ikeda

[11] Patent Number: 5,715,130
[45] Date of Patent: Feb. 3, 1998

[54] DEMAGNETIZATION CIRCUIT AND COMPONENTS THEREFOR

[75] Inventor: Yutaka Ikeda, Shiga, Japan

[73] Assignee: Murata Manufacturing Co., Ltd., Japan

[21] Appl. No.: 789,423

[22] Filed: Jan. 29, 1997

[30] Foreign Application Priority Data

Feb. 19, 1996 [JP] Japan .................. 8-030184

[51] Int. Cl.$^6$ ................................................ H01F 13/00
[52] U.S. Cl. ........................ 361/149; 361/150; 361/267
[58] Field of Search ............................. 361/149–151, 361/267

[56] References Cited

U.S. PATENT DOCUMENTS

| | | | |
|---|---|---|---|
| 3,495,136 | 2/1970 | Gerritsen et al. | 361/150 |
| 3,617,800 | 11/1971 | Ishikawa | 361/150 |
| 3,619,703 | 11/1971 | Yamashita et al. | 361/150 |
| 3,896,330 | 7/1975 | Chamberlain | 361/150 |
| 4,164,775 | 8/1979 | Slegers | 361/150 |
| 4,357,590 | 11/1982 | Belhomme | 361/150 |
| 4,504,817 | 3/1985 | Shikama et al. | 361/150 |
| 5,241,448 | 8/1993 | Stolte | 361/150 |

FOREIGN PATENT DOCUMENTS 57-26982  2/1982  Japan .

*Primary Examiner*—Fritz Fleming
*Attorney, Agent, or Firm*—Majestic, Parsons, Siebert & Hsue P.C.

[57] ABSTRACT

A demagnetization circuit controls a demagnetization current to its demagnetization coil by means of a PTC thermistor with positive characteristic. The PTC thermistor is connected in series with and thermally coupled to a heat-sensitive switch. An NTC thermistor with negative characteristic for suppressing rush current of the voltage source is also thermally coupled to the heat-sensitive switch. After a power switch is closed, the heat-sensitive switch is opened by the heat emitted from the PTC thermistor and remains open by the heat from the NTC thermistor. The two thermistors and the heat-sensitive switch are contained in a case for easy handling and to make the component compact.

9 Claims, 3 Drawing Sheets

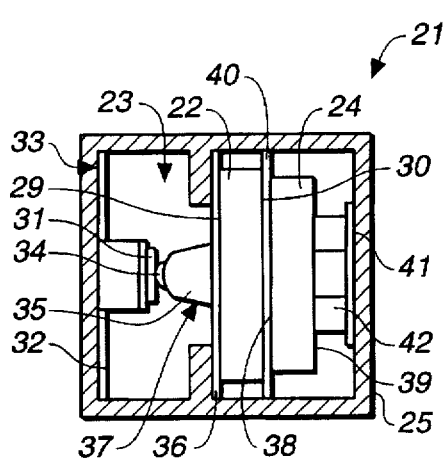
FIG._1A
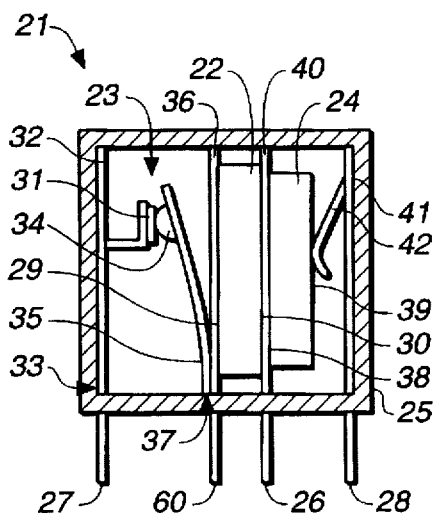
FIG._1B
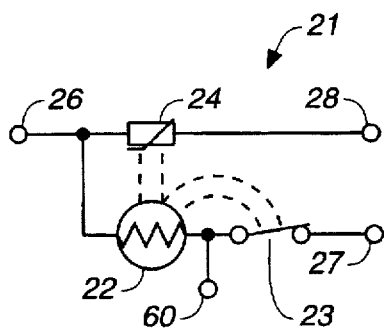
FIG._1C
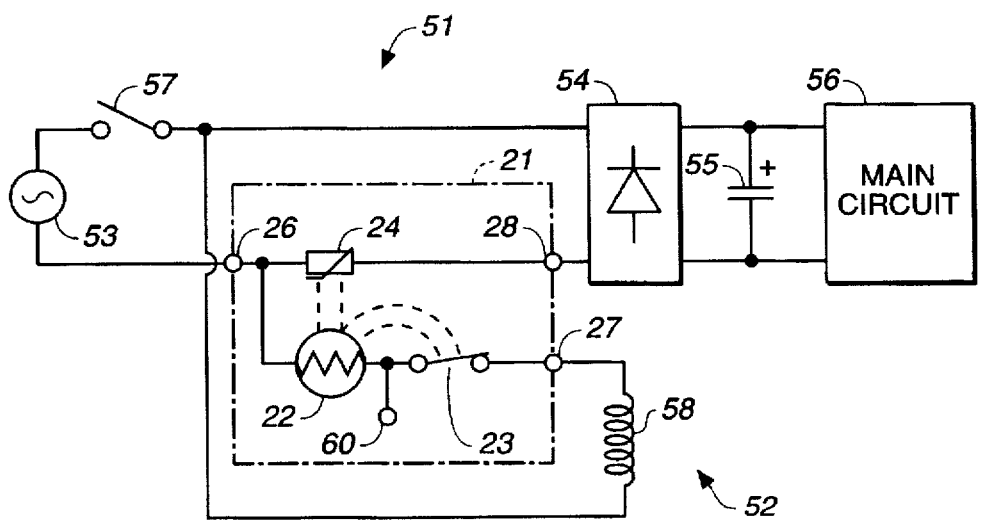
FIG._2

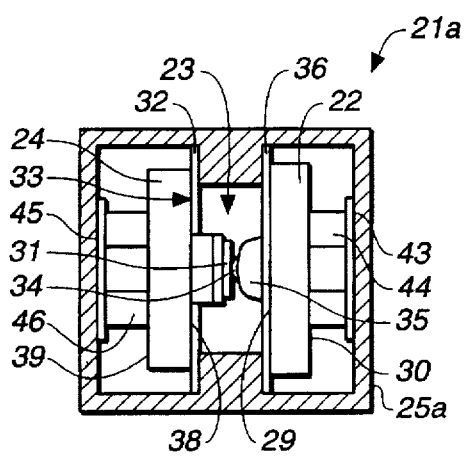
FIG._3A
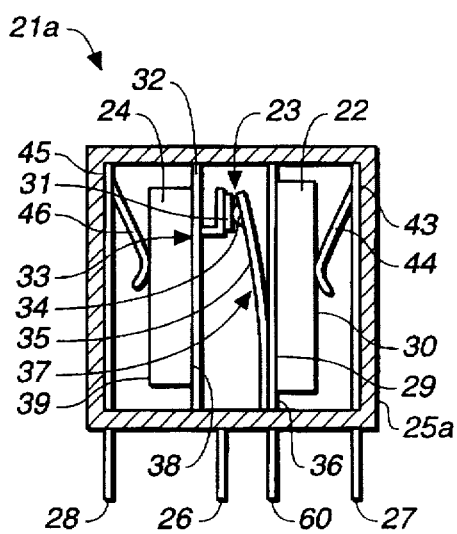
FIG._3B
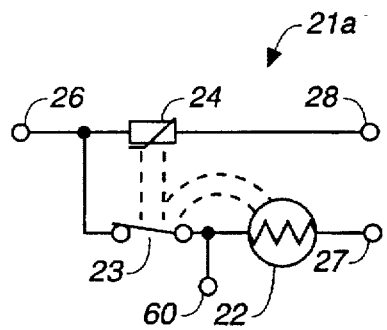
FIG._3C
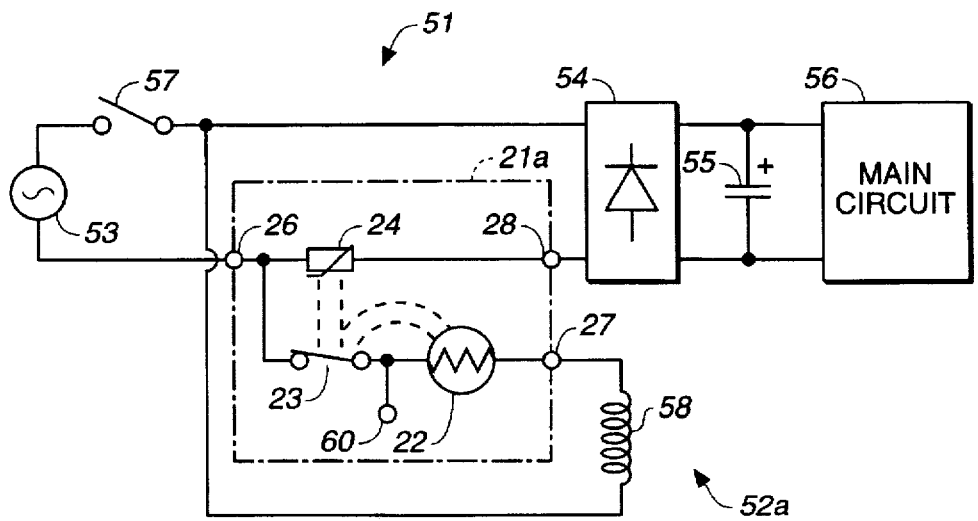
FIG._4

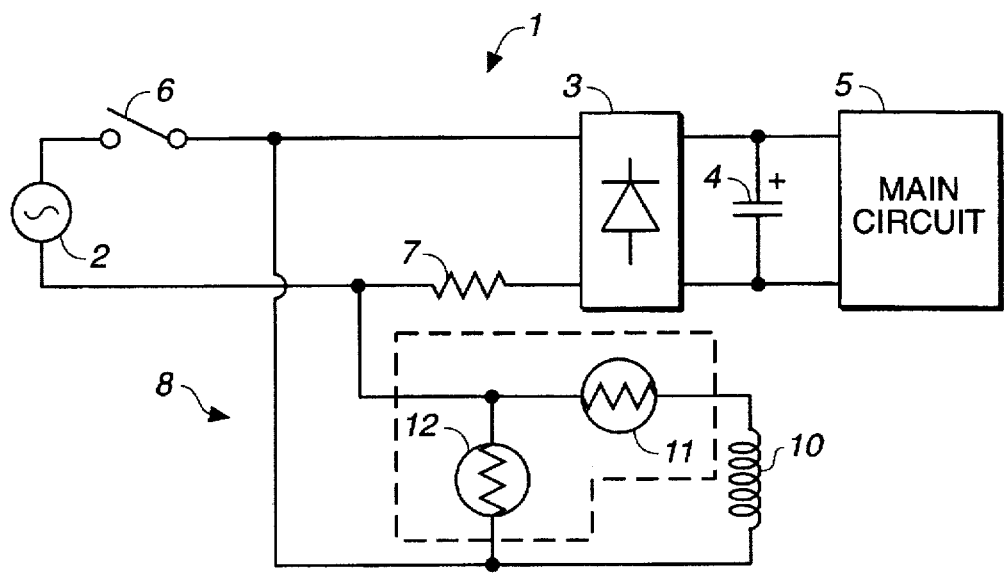
FIG._5
*(PRIOR ART)*
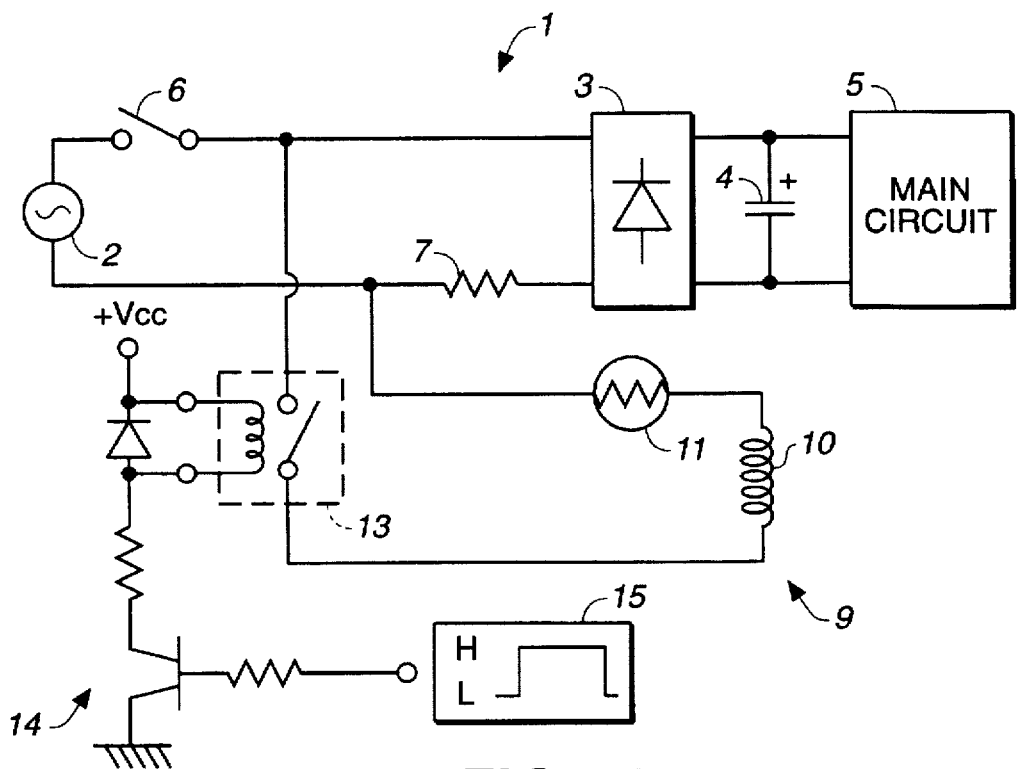
FIG._6
*(PRIOR ART)*

DEMAGNETIZATION CIRCUIT AND COMPONENTS THEREFOR

BACKGROUND OF THE INVENTION

This invention relates to the technology of automatic demagnetization of a Brown tube such as for a color television set or a display monitor and, more particularly, to a demagnetization circuit for carrying out automatic demagnetization, as well as components which may be used advantageously in such a demagnetization circuit.

FIGS. 5 and 6 show two typical examples of a prior art demagnetization circuit used in a color television set or a display monitor, having a source circuit 1 connected to a commercial AC source 2, a diode bridge 3 for rectifying this commercial AC source 2, and a smoothing capacitor 4 for smoothing a DC voltage to be supplied to a main circuit 5. The source circuit 1 may include a source switch 6 and a resistor 7 for damping the rush current from the capacitor 4.

The demagnetization circuits 8 and 9 shown respectively in FIGS. 5 and 6 are each adapted to carry out demagnetization by using a current from the source circuit 1. In the case of the demagnetization circuit 8 of FIG. 5, a control thermistor 11 with positive thermal characteristic for controlling the demagnetization current is connected in series with a demagnetization coil 10, and a heater thermistor 12 with positive thermal characteristic is connected to them in parallel such that these two thermistors 11 and 12 are thermally coupled with each other.

With the demagnetization circuit 8 thus structured, the control thermistor 11 is heated by the heater thermistor 12 such that the resistance of the control thermistor 11 is increased, and this serves to reduce the demagnetization current (residual current) which flows through the demagnetization coil 10 in the steady state after the demagnetization process. After the demagnetization process of this demagnetization circuit 8, however, the resistance of the control thermistor 11 does not increase indefinitely. Since the control thermistor 11 itself has electrostatic capacitance and serves as a capacitor, furthermore, its impedance cannot be increased indefinitely. As a result, a residual current may flow through the demagnetization coil 10 to generate an unwanted magnetic field or to cause an instability in the image, or the image may be disturbed if a current caused by noise invades the demagnetization circuit 8. Since a current continues to flow through both thermistors 11 and 12 even after the demagnetization process has ended, furthermore, there is a wasteful consumption of power (of about 2W).

The demagnetization circuit 9 shown in FIG. 6 can eliminate these problems. Although the control thermistor 11 with positive thermal characteristic for controlling the demagnetization current is connected in series with the demagnetization coil 10, as was the case shown in FIG. 8, there is an electromagnetic relay 13 further connected to them in series. A control signal 15, which reaches a high level for a specified period of time set by a timer circuit (not shown) is adapted to be applied to this electromagnetic relay 13 through a relay control circuit 14 such that the relay 13 will close when demagnetization is to be effected and will open after the demagnetization process is finished.

With the demagnetization circuit 9 thus structured, the impedance is high when the demagnetization circuit 9 is shut off because the shutoff is effected by means of a mechanical contact point such as the electromagnetic relay 13, and hence the adverse effects on the image due to a residual current or a noise current can be prevented. Since the current to the control thermistor 11 is also shut off, furthermore, there is no wasteful consumption of electric power.

The demagnetization circuit 9 of FIG. 6, however, requires the electromagnetic relay 13, its control circuit 14 and a signal source for the control signal 15. In other words, its circuit structure is more complicated and, since so many extra components are required, an increased area on the circuit board will be covered by its components, and this affects the production cost adversely.

Moreover, the electromagnetic relay 13 operates without regard to the ambient temperature or the condition of the control thermistor 11 to shut off the demagnetization circuit 9 after a specified time has elapsed. When the ambient temperature or the temperature of the control thermistor 11 is low, however, it sometimes happens that the temperature of the control thermistor 11 does not rise quickly and hence the attenuation of the demagnetization current becomes slow. For this reason, it may happen when the ambient temperature is low that the demagnetization circuit is shut off before the demagnetization current is sufficiently attenuated. If the demagnetization circuit is thus shut off before the demagnetization current is sufficiently attenuated, not only is the demagnetization effect insufficient but also the shadow mask may be magnetized, resulting in irregular coloring.

Japanese Patent Publication Tokkai 57-26982 has disclosed an automatic demagnetizing device which, like the demagnetization circuit 9 shown in FIG. 6, is adapted to shut off a demagnetization circuit by means of a mechanical contact point. In this case, a heat-sensitive switch is used for shutting off the demagnetization current. A heat-emitting resistor for controlling the rush current of the power source is mostly used as the heating means for activating this heat-sensitive switch. According to the technology disclosed in this publication, however, the heat-sensitive switch is activated without regard to the intensity of the demagnetization current and depending only on the temperature condition of this heat-emitting resistor because the heat-sensitive switch is activated by the heat of the heat-emitting resistor which is independent of the demagnetization circuit. As a result, the demagnetization circuit may be shut off, depending on the ambient temperature, before the demagnetization current is sufficiently attenuated or the demagnetization circuit may fail to be shut off even after an image begins to appear, causing instability in the image. Moreover, the heat-emitting resistor is a part of the source circuit and there is hardly any degree of freedom in the value of its resistance. Thus, it is difficult to appropriately adjust the time for shutting off the heat-sensitive switch. The time to shut off the circuit also varies significantly, depending on the source voltage and the difference in the power consumption (load current) of the color television set or the display monitor.

SUMMARY OF THE INVENTION

It is therefore an object of this invention to provide a demagnetization circuit with which the various problems of the prior art demagnetization circuits can be eliminated.

It is another objects of this invention to provide a demagnetization circuit component which can be used advantageously for forming such a demagnetization circuit.

A demagnetization circuit embodying this invention, with which the above and other objects can be accomplished, may be characterized as comprising a source circuit having a source switch and a suppression thermistor with a negative characteristic for suppressing the rush current, carrying out the demagnetization process by means of a current provided through the source switch, and further comprising a demagnetization coil, a control thermistor with a positive characteristic for controlling the demagnetization current, and a heat-sensitive switch which closes at normal temperatures and opens above a specified temperature. The thermistor with the positive characteristic, the heat-sensitive switch and the demagnetization coil are connected in series, while the heat-sensitive switch is thermally coupled with both thermistors such that, after the source switch is closed, the heat emitted from the thermistor with positive characteristic causes the heat-sensitive switch to open and the heat from the thermistor with negative characteristic serves to keep the heat-sensitive switch in the open condition.

A component embodying this invention, which can be used advantageously for forming such a demagnetization circuit as described above, may be characterized as comprising a thermistor with a positive characteristic having two electrodes (referred to as the first electrode and the second electrode), a heat-sensitive switch connected in series with this thermistor with positive characteristic, another thermistor with a negative characteristic having two electrodes (referred to as the third electrode and the fourth electrode) with the third electrode connected to one end of a series-connected circuit composed of the thermistor with positive characteristic and the heat-sensitive switch, a case containing the thermistor with positive characteristic, the heat-sensitive switch and the other thermistor with negative characteristic, and terminal means (first, second and third) extending from the interior of this case to its exterior. The first terminal means is electrically connected to the end, on the side connected to the thermistor with negative characteristic, of the aforementioned series-connected circuit. The second terminal means is electrically connected to the other end this series-connected circuit, and the third terminal means is electrically connected to the fourth electrode of the thermistor with negative characteristic. The heat-sensitive switch comprises a fixed member having a fixed contact point and a mobile member having a mobile piece with a mobile contact point adapted to contact the fixed contact point at normal temperatures but to be separated therefrom above a specified temperature. The aforementioned mobile piece is disposed so as to operate, being thermally couple with both the thermistor with positive characteristic and the thermistor with negative characteristic.

According to a preferred embodiment of the invention, the first electrode of the thermistor with positive characteristic is disposed so as to be in contact with the mobile member. With their positional relationship so selected, the heat-sensitive switch, the thermistor with positive characteristic and the thermistor with negative characteristic may be arranged inside the case in that order, or they may be arranged in the order of the thermistor with positive characteristic, the heat-sensitive switch and the thermistor with negative characteristic. In the case of the former arrangement, it is preferred that the component further comprise a first terminal member which is disposed between the thermistors with positive and negative characteristics and in contact with both the second electrode and the third electrode, and a second terminal member which is in contact with the fourth electrode of the thermistor with negative characteristic. The first terminal member serves as the first terminal means, the fixed member as the second terminal means, and the second terminal member as the third terminal means. In the case of the latter arrangement, it is preferred to dispose the fixed member so as to be in contact with the third electrode of the thermistor with negative characteristic, the component further comprising a third terminal member which contacts the second electrode of the thermistor with positive characteristic and a fourth terminal member which is in contact with the fourth electrode of the thermistor with negative characteristic. The fixed member may serve as the first terminal means, the third terminal member as the second terminal means, and the fourth terminal member as the third terminal means. In both situations, a fourth terminal means extending from the interior of the case to the exterior may be provided, the aforementioned mobile member serving as the fourth terminal means.

With a demagnetization circuit embodying this invention, a current is introduced and its demagnetization process is started when the source switch is closed, causing the thermistor with positive characteristic to heat up at the same time. The heat-sensitive switch opens as this heat is received thereby and its temperature reaches a specified level. This level may be determined such that the thermistor with positive characteristic can sufficiently attenuate the demagnetization current supplied to the demagnetization coil and hence that the demagnetization circuit can be shut off after the demagnetization current has reached an appropriate intensity. In summary, since the heat-sensitive switch is activated by receiving the heat from the thermistor with positive characteristic, the demagnetization circuit can be shut off reliably at a suitable timing with respect to the condition of the demagnetization current, without regard to the variable factors such as the ambient temperature. Since the demagnetization circuit can be shut off reliably at a suitable timing, occurrence of irregularities in the images of color televisions and display monitors caused by a residual current or a noise current can be prevented.

As the demagnetization circuit is shut off, the thermistor with positive characteristic ceases to emit heat but since the power switch is closed, a current continues to flow through the thermistor with negative characteristic, causing it to emit heat. Thus, the heat-sensitive switch remains in the open condition, receiving heat from the thermistor with negative characteristic, as long as the power switch is closed.

If a switch is provided between the fourth terminal means and the fixed member, a demagnetization process can be carried out while the heat-sensitive switch is open. A shadow mask, for example, which is weakly magnetized while a color television or a display monitor is being used, can thus be demagnetized.

when the power switch is opened, the thermistor with negative characteristic ceases to emit heat and the temperature of the heat-sensitive switch goes down. Since the heat-sensitive switch is thermally coupled to the thermistor with positive characteristic, it does not close unless the temperature of the thermistor with positive characteristic goes down to the specified temperature. In other words, the shadow mask will not be magnetized inadvertently, and irregularities in coloring will not occur until the specified temperature is reached because no current will pass through the demagnetization circuit.

Because the thermistor with negative characteristic is adapted to function as an element for suppressing a rush current, its power consumption is only comparable to that of a conventional power circuit. In other words, there is no increase in wasteful power consumption, and the power consumption in the demagnetization circuit can be made smaller, for example, than that for the prior art demagnetization circuit 8 shown in FIG. 5 wherein electric currents keep flowing through both its thermistors 11 and 12 even after the demagnetization activity is completed.

This invention also provides a demagnetization circuit with a simpler circuit structure. In other words, this invention makes it possible to reduce the number of components and the area on the circuit board which is occupied.

Components embodying this invention for forming a demagnetization circuit are advantageous in that thermistors and a heat-sensitive switch with characteristics as described above are contained inside a case so as to be easy to handle as a unit, for example, when they are mounted to a circuit board. Since they are compact, they allow the size of the color television sets and the display monitors which incorporate them to be reduced. Since the thermistors and the heat-sensitive switch are all contained inside a case, furthermore, the thermistors can be more effectively coupled thermally to the mobile piece of the heat-sensitive switch.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1A is a top view of a component according to this invention for forming a demagnetization circuit, shown with a portion of its case removed, FIG. 1B is a front view of the component of FIG. 1A, and FIG. 1C is an equivalent circuit diagram of the component of FIGS. 1A and 1B;

FIG. 2 is a circuit diagram of a demagnetization circuit incorporating the component shown in FIGS. 1A, 1B and 1C, using a current provided from a source circuit through a source switch;

FIG. 3A is a top view of another component according to this invention for forming a demagnetization circuit, shown with a portion of its case removed, FIG. 3B is a front view of the component of FIG. 3A, and FIG. 3C is an equivalent circuit diagram of the component of FIGS. 3A and 3B;

FIG. 4 is a circuit diagram of a demagnetization circuit incorporating the component shown in FIGS. 3A, 3B and 3C, using a current provided from a source circuit through a source switch;

FIG. 5 is a circuit diagram of a source circuit of a conventional color television set or a display monitor and a conventional demagnetization circuit; and FIG. 6 is a circuit diagram of a source circuit of a conventional color television set or a display monitor and another conventional demagnetization circuit.

Throughout herein, components which are substantially the same or at least equivalent to each other are indicated by the same numeral and are not necessarily explained repetitively.

DETAILED DESCRIPTION OF THE INVENTION

FIGS. 1A and 1B show a component 21, embodying this invention, for forming a demagnetization circuit as comprising a thermistor with positive thermal characteristic (referred to as the PTC thermistor) 22, a heat-sensitive switch 23, a thermistor with negative thermal characteristic (referred to as the NTC thermistor) 24, a case 25 which contains the PTC thermistor 22, the heat-sensitive switch 23 and the NTC thermistor 24, and terminals (that is, a first terminal 26, a second terminal 27, a third terminal 28 and a fourth terminal 60) which extend from the interior of the case 25 to its exterior.

The PTC thermistor 22 has electrodes 29 and 30 formed on its mutually opposite main surfaces, and its resistance at room temperature and its Curie temperature are preferably less than 30 $\Omega$ and 50° C.–100° C., respectively. If the resistance at room temperature exceeds 30 $\Omega$, it is not possible to obtain a sufficiently large rush current. If the Curie temperature is below 50° C., the action of the PTC thermistor 22 fluctuates significantly by the ambient temperature and adequate control over demagnetization is impossible. If the Curie temperature exceeds 100° C., on the other hand, attenuation of the demagnetization current becomes exceedingly slow.

The heat-sensitive switch 23 is connected in series with the PTC thermistor 22 and comprises a fixed member 33 provided with a metallic plate 32 having a fixed contact point 31 and a mobile member 37 provided with a metallic plate 36 which supports a mobile piece 35 having a mobile contact point 34. The metallic plates 32 and 36 may comprise, for example, stainless steel, phosphor bronze or Cu—Ti. The mobile piece 35 may comprise a bimetal or a shape-memorizing alloy, such that the mobile contact point 34 is in contact with the fixed contact point 31 at normal temperatures but is separated therefrom above a specified temperature. The metallic plate 32 of the fixed member 33 and the metallic plate 36 of the mobile member 37 are both extended to the exterior of the case 25 to form the aforementioned second and fourth terminals 27 and 60, respectively. The second terminal 27 and the fourth terminal 60, thus formed, are electrically connected to the end of the series connection of the PTC thermistor 22 and the heat-sensitive switch 23 opposite from the other end at which the NTC thermistor 24 is connected.

The mobile member 37 (or the metallic plate 36, to be more specific) of the heat-sensitive switch 23 is in contact with one of the electrodes (29) of the PTC thermistor 22 such that the heat-sensitive switch 23 and the PTC thermistor 22 are thermally coupled to each other and the mobile piece 35 can be activated by the heat from the PTC thermistor 22.

If a bimetal is used for the mobile piece 35 of the heat-sensitive switch 23, its operational temperature is in the range of 40° C.–120° C. A material with return temperature in the range of 40° C.–120° C. is preferable because materials with operational temperature lower than 40° C. are influenced too much by the ambient temperature and, although the temperature of the PTC thermistor rises to about 120° C., the bimetal will not function even if the operational temperature is set higher.

The NTC thermistor 24 has electrodes 38 and 39 formed on its mutually opposite main surfaces, and its resistance at room temperature and its B constant are preferably 1 $\Omega$–100 $\Omega$ and over 2000K, respectively. If the B constant is less than 2000K or the resistance at room temperature exceeds 100 $\Omega$, the value of resistance at the stable time cannot be made sufficiently small. If the resistance at room temperature is less than 1 $\Omega$, on the other hand, the rush current cannot be attenuated sufficiently.

One of the electrodes (38) of the NTC thermistor 24 is connected to one end of the series connection of the PTC thermistor 22 and the heat-sensitive switch 23. Explained more in detail, a terminal member 40 is disposed between the PTC thermistor 22 and the NTC thermistor 24 so as to be in contact with both the electrode 30 of the PTC thermistor 22 and the electrode 38 of the NTC thermistor 24. The terminal member 40 comprises, for example, stainless steel, phosphor bronze or Cu—Ti and extends to the exterior of the case 25 to form the aforementioned first terminal 26. The first terminal 26, thus formed, is electrically connected to the end of the series connection of the PTC thermistor 22 and the heat-sensitive switch 23 on the same side as where the NTC thermistor 24 is connected.

The NTC thermistor 24 is also thermally coupled to the mobile piece 35 of the heat-sensitive switch 23. Explained more in detail, the NTC thermistor 24 is not only in contact with the metallic plate 36 of the heat-sensitive switch 23 through the terminal member 40 and the PTC thermistor 22 but also disposed inside the case 25 near the mobile piece 35 so as to be able to thermally influence the mobile piece 35.

Between the outwardly facing electrode 39 of the NTC thermistor 24 and the inner surface of the case 25, there is another terminal member 41 electrically connected to the electrode 39. This terminal member 41, which may also comprise, for example, stainless steel, phosphor bronze or Cu—Ti, in part forms a spring-like elastic contact piece 42 serving to push the NTC thermistor 24 towards the PTC thermistor 22. The terminal member 41 extends to the exterior of the case 25 to form the aforementioned third terminal 28.

The case 25 is made from a heat-resistant material. Heat-resistant resins such as phenol resins, polybutylene terephthalate and polyphenylene sulfide or ceramics such as alumina may be used for the purpose.

The demagnetization circuit component 21 thus structured has an equivalent circuit diagram as shown in FIG. 1C and may be incorporated, as shown enclosed by a broken line in FIG. 2, in a demagnetization circuit 52 to carry out demagnetization by means of a current supplied from a source circuit 51, for example, of a color television or a display monitor. The source circuit 51 shown in FIG. 2, like the prior art source circuit 1 shown in FIGS. 5 and 6, is adapted to be connected to a commercial AC power source 53, to use a diode bridge 54 to rectify this AC source 53 and a smoothing capacitor 55 to obtain a smoothed DC current and to supply it to a main circuit 56. Numeral 57 in FIG. 2 indicates a power switch, and numeral 58 indicates a demagnetization coil connected in series with the series-connection consisting of the PTC thermistor 22 and the heat-sensitive switch 23. With the terminals 26, 27 and 28 of the component 21 connected as shown in FIG. 2, the NTC thermistor 24 can be made to serve as a resistor for suppressing a rush current from the capacitor 55.

If the power switch 57 is closed, a current flows not only in the power circuit 51 but also in the demagnetization circuit 52, starting its demagnetization operation and causing the PTC thermistor 22 at the same time to emit heat. The heat-sensitive switch 23 opens when it reaches a specified temperature by receiving this heat emitted from the PTC thermistor 22. This specified temperature is adjusted such that the heat-sensitive switch 23 will open when it reaches a temperature at which the demagnetization current supplied from the PTC thermistor 22 to the demagnetization coil 58 can be attenuated sufficiently and hence that the demagnetization circuit 52 is shut off after the demagnetization current has reached an appropriate value.

When the demagnetization circuit 52 is shut off, the PTC thermistor 22 ceases to emit heat but since the power switch 57 remains closed, a current continues to flow through the NTC thermistor 24 and the NTC thermistor 24 continues to emit heat. As long as the power switch 57 is closed, the heat-sensitive switch 23 maintains its open condition by receiving the heat from the NTC thermistor 24.

When the power switch 57 is opened, the NTC thermistor 24 ceases to emit heat and the temperature of the heat-sensitive switch 23 goes down. Since the heat-sensitive switch 23 is thermally coupled to the PTC thermistor 22, however, the heat-sensitive switch 23 will not close unless the temperature of the PTC thermistor 22 drops to the specified level. In other words, a shadow mask (not shown), for example, will not be magnetized inadvertently and irregularities in coloring will not occur because no current will flow through the demagnetization circuit until the temperature of the PTC thermistor 22 drops to the specified temperature.

Because the NTC thermistor 24 is adapted to function as an element for suppressing the rush current, as explained above, its power consumption is comparable to that by the resistor 7 of the conventional power circuit 1 shown in FIGS. 5 and 6. In other words, there is no increase in wasteful power consumption.

If a switch (not shown) is inserted between the second terminal 27 and the fourth terminal 60, a demagnetization process can be carried out while the heat-sensitive switch 23 is open. A shadow mask, for example, which is weakly magnetized while a color television or a display monitor is being used, can thus be demagnetized by closing such a switch whenever it is necessary.

FIGS. 3A, 3B and 3C show another demagetization circuit component 21a embodying this invention, using the same numerals to indicate the same, or at least equivalent, components shown already in and described in connection with FIGS. 1A, 1B and 2. The component 21a according to this embodiment is different from the one shown in FIGS. 1A, 1B and 2 in that, while the latter contains its heat-sensitive switch 23, PTC thermistor 22 and NTC thermistor 24 in this order inside its case 25 (that is, the PTC thermistor 22 is sandwiched between the heat-sensitive switch 23 and the NTC thermistor 24), the former contains them within its case 25a in the order of the PTC thermistor 22, the heat-sensitive switch 23 and the NTC thermistor 24 (that is, the heat-sensitive switch 23 is sandwiched between the PTC and NTC thermistors 22 and 24). The metallic plate 32 of the fixed member 33 for the heat-sensitive switch 23 is in contact with one of the electrodes (38) of the NTC thermistor 24 and forms the first terminal 26 which is electrically connected to the end of the series connection consisting of the PTC thermistor 22 and the heat-sensitive switch 23 on the side where it is connected to the NTC thermistor 24 thermally coupled to the heat-sensitive switch 23. The metallic plate 36 of the mobile member 37 of the heat-sensitive switch 23 is in contact with one of the electrodes (29) of the PTC thermistor 22. The PTC thermistor 22 and the heat-sensitive switch 23 are thermally coupled to each other such that the mobile plate 35 can be activated by the heat emitted from the PTC thermistor 22.

Between the outwardly facing electrode 30 of the PTC thermistor 22 and the inner surface of the case 25a, there is a terminal member 43 which is in contact with this electrode 30 and forms a spring-like elastic contact piece 44 serving to push the PTC thermistor 22 towards the metallic plate 36. This terminal member 43 extends to the exterior of the case 25a to form the second terminal 27 which is electrically connected to the end of the series connection consisting of the PTC thermistor 22 and the heat-sensitive switch 23 opposite from the side where it is connected to the NTC thermistor 24.

Between the outwardly facing electrode 39 of the NTC thermistor 24 and the inner surface of the case 25a, there is another terminal member 45 which is electrically connected to the electrode 39 of the NTC thermistor 24. This terminal member 45 also forms a spring-like elastic contact piece 46 serving to push the NTC thermistor 24 towards the metallic plate 32. This terminal member 45 extends to the exterior of the case 25a to form the third terminal 28.

The demagnetization circuit component 21a thus structured has an equivalent circuit diagram as shown in FIG. 3C and, like the component 21 described above, may be incorporated, as shown enclosed by a broken line in FIG. 4, in a demagnetization circuit 52a to carry out demagnetization by means of a current supplied from a source circuit 51, for example, of a color television or a display monitor. In FIG. 4, too, those components which are substantially the same as or at least equivalent to those shown in FIG. 2 are indicated by the same numerals. Thus, numeral 58 again indicates a demagnetization coil, which is connected in series with the series-connection consisting of the PTC thermistor 22 and the heat-sensitive switch 23. With the terminals 26, 27 and 28 of the component 21a connected as shown in FIG. 4, the NTC thermistor 24 can be made to serve as a resistor for suppressing a rush current from the capacitor 55.

As can be understood, there is no substantial difference between FIGS. 2 and 4 except that the PTC thermistor 22 and the heat-sensitive switch 23 are connected in different orders. Thus, the operations of the demagnetization circuit 52a are substantially the same as those of the circuit 52 shown in FIG. 2. The embodiment shown in FIGS. 3A, 3B and 4 are advantageous in that the heat from the thermistors 22 and 24 can be received more easily by the heat-sensitive switch 23 because the heat-sensitive switch 23 according to this embodiment is placed between the two thermistors 22 and 24.

What is claimed is:

1. A demagnetization circuit combined with a source circuit having a source switch and an NTC thermistor, which is a thermistor with negative characteristic for suppressing rush current, for carrying out demagnetization by using a demagnetization current provided through said source switch, said demagnetization circuit comprising:

a demagnetization coil;

a PTC thermistor, which is a thermistor with positive characteristic for controlling said demagnetization current; and a heat-sensitive switch which is closed at normal temperatures and opens at temperatures above a specified temperature;

said PTC thermistor, said heat-sensitive switch and said demagnetization coil being connected in series;

said heat-sensitive switch being thermally coupled to both said PTC thermistor and said NTC thermistor; and heat emitted from said PTC thermistor being capable of opening said heat-sensitive switch and heat emitted from said NTC thermistor being capable of keeping said heat-sensitive switch open after said source switch is closed.

2. A component for a demagnetization circuit, said component comprising:

a PTC thermistor, which is a thermistor with positive characteristic, having a first electrode and a second electrode;

a heat-sensitive switch connected in series with said PTC thermistor to together form a series-connected circuit;

an NTC thermistor, which is a thermistor with negative characteristic, having a third electrode and a fourth electrode, said third electrode being connected to one end of said series-connected circuit;

a case which encloses therein said PTC thermistor, said heat-sensitive switch and said NTC thermistor; and a first terminal means, a second terminal means and a third terminal means, each extending from the interior of said case to the exterior of said case, said first terminal means being electrically connected to said one end of said series-connected circuit, said second terminal means being electrically connected to the other end of said series-connected circuit opposite said one end, said third terminal means being electrically connected to said fourth electrode of said NTC thermistor, said heat-sensitive switch comprising a fixed member and a mobile member, said fixed member having a fixed contact point, said mobile member being provided with a mobile piece having a mobile contact point which contacts said fixed contact point at normal temperatures and separates from said fixed contact point at temperatures above a specified temperature, and said mobile piece being thermally coupled to both said PTC thermistor and said NTC thermistor.

3. The component of claim 2 wherein said first electrode of said PTC thermistor is in contact with said mobile member.

4. The component of claim 3 wherein said PTC thermistor is disposed between said heat-sensitive and said NTC thermistor inside said case.

5. The component of claim 4 further comprising:

a first terminal member which is disposed between said PTC thermistor and said NTC thermistor and is in contact with both said second electrode and said third electrode; and a second terminal member contacting said fourth terminal of said NTC thermistor;

said first terminal member comprising said first terminal means, said fixed member comprising said second terminal means, and said second terminal member comprising said third terminal means.

6. The component of claim 5 further comprising a fourth terminal means extending from the interior of said case to the exterior of said case, said mobile member comprising said fourth terminal means.

7. The component of claim 3 wherein said heat-sensitive switch is disposed between said PTC thermistor and said NTC thermistor inside said case.

8. The component of claim 7 further comprising:

a third terminal member contacting said second electrode of said PTC thermistor; and a fourth terminal member contacting said fourth electrode of said NTC thermistor;

said fixed member contacting said third electrode of said NTC thermistor, said fixed member comprising said first terminal means, said third terminal member comprising said second terminal means, and said fourth terminal member comprising said third terminal means.

9. The component of claim 8 further comprising a fourth terminal means extending from the interior of said case to the exterior of said case, said mobile member comprising said fourth terminal means.

* * * * *